(12) United States Patent
Nishizawa

(10) Patent No.: US 6,276,767 B1
(45) Date of Patent: Aug. 21, 2001

(54) BRAKING FORCE DISTRIBUTION CONTROL SYSTEM AND METHOD

(75) Inventor: Hiromitsu Nishizawa, Shizuoka-ken (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/399,138

(22) Filed: Sep. 20, 1999

(30) Foreign Application Priority Data

Sep. 22, 1998 (JP) .................................................. 10-268253

(51) Int. Cl.$^7$ .................................. B60T 8/28; B60T 8/70
(52) U.S. Cl. ..................... 303/186; 188/349; 188/181 C; 303/113.5
(58) Field of Search ................................ 303/186, 113.5, 303/187, 188, 189, 176, 177, 183, 9.61, 9.71, 9.75, 9.67, 9.68, 24.1, 198, 22.1–22.8; 188/349, 181 C, 181 A, 195; 701/71, 70, 72, 79, 78, 83, 74

(56) References Cited

U.S. PATENT DOCUMENTS

| | | |
|---|---|---|
| 4,505,520 * | 3/1985 | Maehara ........................... 188/181 C |
| 5,620,239 | 4/1997 | Mihara et al. . |
| 5,624,164 | 4/1997 | Tozu et al. . |
| 5,634,699 | 6/1997 | Ichikawa et al. . |
| 5,640,324 | 6/1997 | Inagaki . |
| 5,641,209 | 6/1997 | Kushi et al. . |
| 5,646,849 | 7/1997 | Walenty et al. . |
| 5,676,434 | 10/1997 | Ichikawa et al. . |
| 5,697,682 | 12/1997 | Watanabe et al. . |
| 5,700,074 | 12/1997 | Sugimoto et al. . |
| 5,711,585 | 1/1998 | Tozu et al. . |
| 5,752,211 | 5/1998 | Takasaki et al. . |
| 5,752,752 | 5/1998 | Tozu et al. . |
| 5,758,930 | 6/1998 | Schiel et al. . |
| 5,762,406 | 6/1998 | Yasui et al. . |
| 5,772,289 | 6/1998 | Nakazawa et al. . |
| 5,795,039 | 8/1998 | Fennel et al. . |
| 5,806,939 | 9/1998 | Feigel et al. . |
| 5,810,455 | 9/1998 | Noguchi . |
| 5,810,456 | 9/1998 | Inagaki et al. . |
| 5,826,954 | 10/1998 | Schmitt et al. . |
| 5,829,847 | 11/1998 | Tozu et al. . |
| 5,842,755 | 12/1998 | Sugimoto et al. . |
| 5,853,229 | 12/1998 | Willmann et al. . |
| 5,857,754 | 1/1999 | Fukami et al. . |
| 5,860,710 * | 1/1999 | Takemasa ............................ 303/186 |
| 5,869,943 | 2/1999 | Nakashima et al. . |
| 5,882,093 | 3/1999 | Enomoto et al. . |
| 5,887,957 | 3/1999 | Büttner et al. . |
| 5,913,578 | 6/1999 | Tozu et al. . |
| 5,927,830 | 7/1999 | Tozu et al. . |
| 5,931,546 | 8/1999 | Nakashima et al. . |
| 5,938,299 | 8/1999 | Hara et al. . |
| 5,947,221 | 9/1999 | Taniguchi et al. . |
| 5,947,224 | 9/1999 | Kouno . |
| 5,951,115 | 9/1999 | Sakai et al. . |

FOREIGN PATENT DOCUMENTS 58-156443 * 9/1983 (JP) .
2212248 * 8/1990 (JP) .

* cited by examiner

Primary Examiner—Douglas C. Butler
(74) Attorney, Agent, or Firm—Bozicevic, Field & Francis LLP; Alan W. Cannon, Esq.

(57) ABSTRACT

A system and method for initiating a braking force distribution control are disclosed. In one embodiment the deceleration of a front wheel and rear wheel are determined. When the front wheel deceleration is less than the rear wheel deceleration, the braking force distribution control is initiated.

9 Claims, 9 Drawing Sheets

BRAKING FORCE DISTRIBUTION CONTROL SYSTEM AND METHOD

This application claims priority to Japanese application H10-268253 filed Sep. 22, 1998, to which application priority is claimed under 35 U.S.C. §119.

FIELD OF THE INVENTION

This invention relates to braking force distribution control system and method used with a motor vehicle.

BACKGROUND OF THE INVENTION

Traditionally, an anti-lock brake system, also referred to as a braking force distribution control system is terminated when the system recognizes that a vehicle speed is sufficiently low, i.e., the vehicle speed is slow enough as to not require braking force distribution control system as it comes to a stop. At this point, the braking force distribution control system may be terminated when a brake switch is turned off (from on). Alternatively, a pressure increase pulse is sent for a predetermined number of times n or more than n in a pressure increase mode of a braking force distribution control system. However, when a driver is pumping the brakes, the brake pedal is repeatedly applied and released. Accordingly, the brake switch may not be turned off resulting in continued use of the braking force distribution control system even though the vehicle speed is sufficiently low such that the system should be terminated.

In view of the aforementioned problems, the objective of this invention is to optimize the timing of terminating braking force distribution control system by sensing the shifting of the vehicle load from front to rear wheels on the basis of the estimated deceleration of front and rear wheels.

SUMMARY OF THE INVENTION

A hydraulic system and method for effectively initiating a vehicle's braking force distribution control system is disclosed. The method comprises (1) comparing estimated wheel determined at a current and a previous cycle; and (2) initiating the braking force distribution controls (which controls inlet and outlet valve of the rear wheel) when (a) the current estimated wheel deceleration is greater than the previous estimated wheel deceleration, (b) the difference of (a) continues for a predetermined number of cycles and (c) deceleration of the front wheel becomes less that the deceleration of the rear wheel.

Another embodiment of the braking force distribution control method of the invention is also disclosed. The method is carried out using a brake hydraulic pressure device for a motor vehicle which device includes a hydraulic unit. The hydraulic unit is comprised of a main hydraulic circuit connecting master cylinder to a wheel cylinder via an inlet valve. The hydraulic unit also comprises an auxiliary hydraulic circuit which connects an auxiliary reservoir to the wheel cylinder via an outlet valve. An electronic control device controls the hydraulic unit in accordance with the method of the invention. Specifically, the braking force distribution control, which controls the inlet and outlet valves for the rear wheels is initiated. Initiation occurs when the deceleration of a front wheel is determined to be less that the deceleration of a rear wheel.

An object of the invention is to provide a system and method which effectively terminates the brake force distribution control system when specific conditions are present.

An advantage of the invention is that it can be readily integrated into a conventional hydraulic brake system.

A feature of the invention is that it operates by controlling inlet and outlet valves of a rear wheel cylinder These and other objects and advantages and features of the present invention will become readily apparent by reference to the following detailed description when considered in conjunction with the accompanying drawings.

DESCRIPTION OF THE PREFERRED EMBODIMENTS

Figure 1:
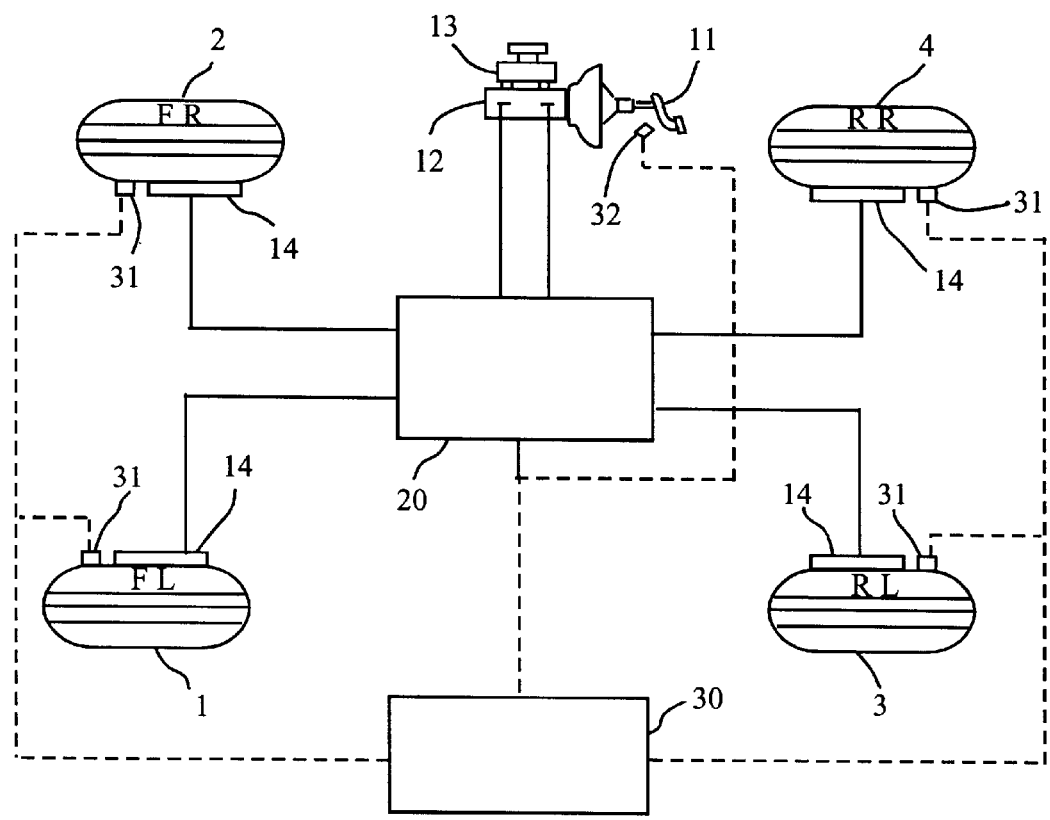
FIG. 1 is a schematic view of the brake control device.

In a first aspect of the invention, a braking force distribution control method is provided. The method uses a brake hydraulic pressure device of the type used in a motor vehicle. This device comprises a hydraulic unit. The hydraulic unit comprises a main hydraulic circuit connecting a master cylinder to a wheel cylinder via an inlet valve. The hydraulic unit also comprises an auxiliary hydraulic circuit connecting an auxiliary reservoir to the wheel cylinder via an outlet valve. An electronic control device controls the hydraulic unit. Control is carried out in a manner such that when the deceleration of a front wheel becomes less than a deceleration of a rear wheel, braking force distribution control, which controls the inlet and outlet valves of rear wheel, is initiated.

In a second aspect of the invention, a braking force distribution control system and method is provided. A brake hydraulic pressure device for a motor vehicle comprises a hydraulic unit. The hydraulic unit comprises a main hydraulic circuit connecting a master cylinder to a wheel cylinder via an inlet valve. The hydraulic unit further comprises an auxiliary hydraulic circuit connecting an auxiliary reservoir to the wheel cylinder via an outlet valve. An electronic control device controls the hydraulic unit. The system operates by comparing estimated wheel decelerations determined at current and previous cycles. Braking force distribution control (which controls inlet and outlet valves of the rear wheel) is initiated when (a) the current estimated wheel deceleration is greater than the previous estimated wheel deceleration, (b) that differences continues for a number of cycles and (c) the deceleration of a front wheel drops below the deceleration of a rear wheel.

EXAMPLE

An example of the invention is explained with reference to the figures.

Summary of the Vehicle Brake Hydraulic Pressure Device

In a brake hydraulic pressure device for a motor vehicle, hydraulic pressure is created in the hydraulic unit 20. This pressure is transferred to each wheel cylinder 14 of the front and rear wheels in order to operate the brake control on each of the four wheels (i.e, left front wheel 1, right front wheel 2, left rear wheel 3, right rear wheel 4). A braking force distribution control system and an anti-lock brake control system (ABS), operate using signals from different sources such as wheel speed sensor 31 and brake switch 32. The electronic control device 30 controls the hydraulic unit 20 thereby providing optimum brake control relative to vehicle wheels. The electronic control device 30 includes a brake pedal operation judging means regulates the stepping speed of the brake pedal. The electronic control device 30 may include additional components such as special hardware and conventional computing devices such as a microcomputer.

Summary of the Hydraulic Unit

Figure 2:
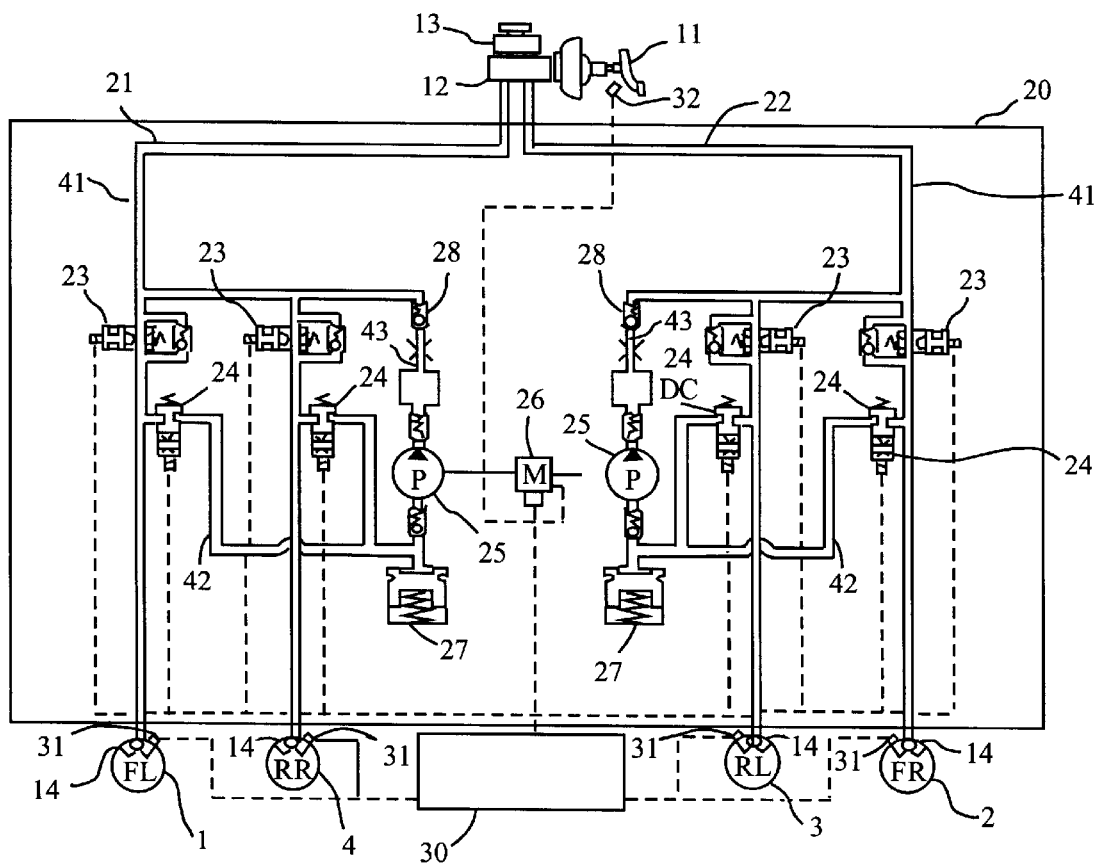
FIG. 2 is a brake hydraulic pressure device for four wheels.

An embodiment of a hydraulic unit 20 is show in FIG. 2. The hydraulic unit 20 comprises hydraulic circuits such as a braking force distribution control system and ABS. FIG. 2 shows an example of X-piping, where the left front wheel 1 and right wheel 4 are connected to one first hydraulic circuit 21. The right front wheel 2 and left rear wheel 3 are connected to the other independent second hydraulic circuit 22.

The hydraulic unit 20 comprises the main circuit 41 connecting with each wheel cylinder 14 via the master cylinder 12 and the inlet valve 23. In addition a connection is provided between the auxiliary hydraulic circuits 42 and the auxiliary reservoirs 27 via each wheel cylinder 14 and the outlet valve 24. Further, a connection returning the reverse hydraulic circuit 43 from the auxiliary reservoir 27 to the main hydraulic circuits 41 via the pumps 25 is also provided. The hydraulic unit 20 controls the opening and closing of the inlet valve 23 and the outlet valves 24 thereby operating specified brake control for each wheel. In addition, the main reservoir 13 reserves the brake fluid and prevents a reverse flow. The motor 26 operates and controls the pumps 25.

Operation of the brake hydraulic pressure device is explained below.

Summary of Brake Control

Figure 3:
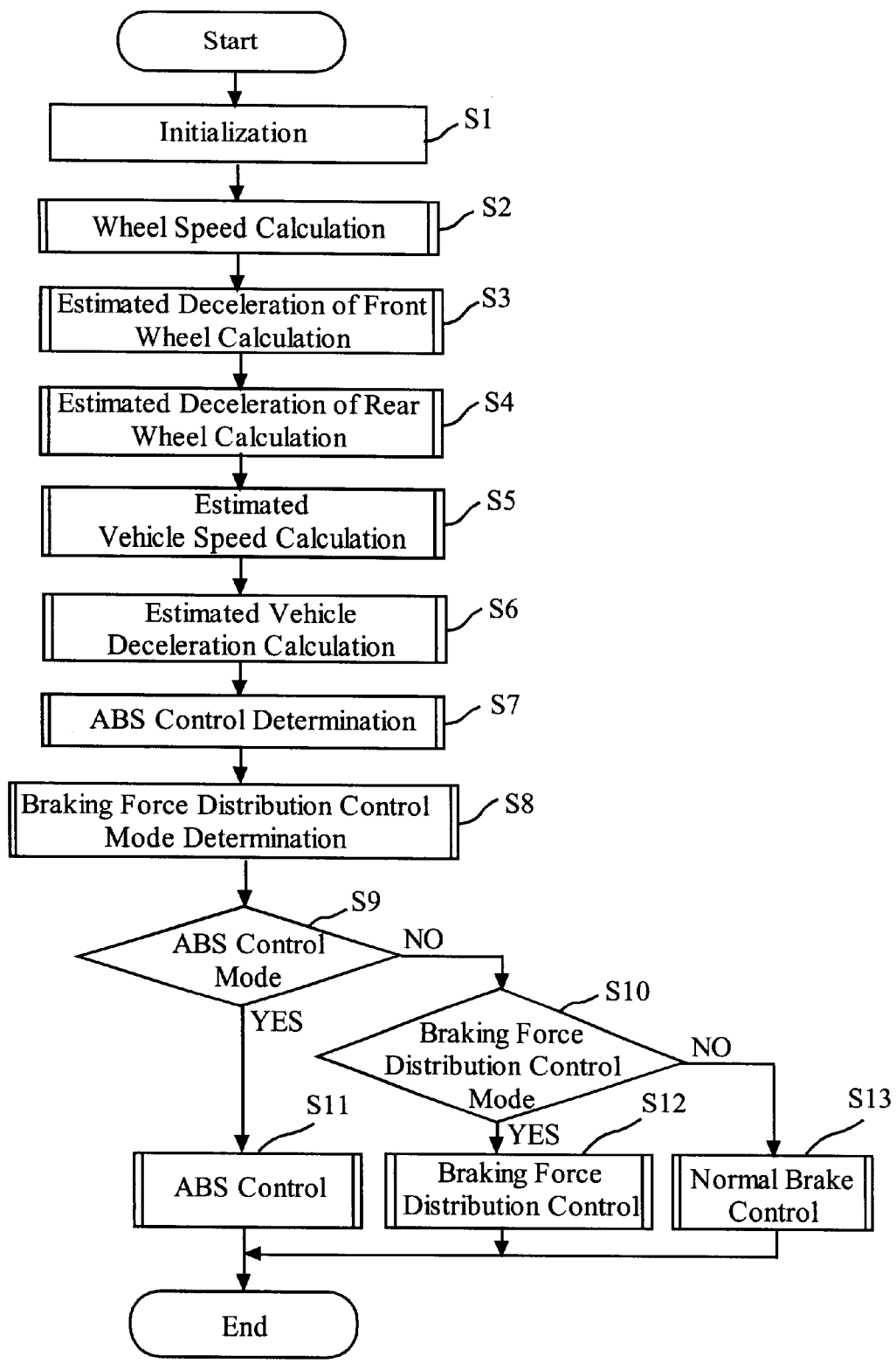
FIG. 3 is a flow-chart of the brake control.

FIG. 3 shows an embodiment of how the electronic control device 30 conducts a brake control calculation using a signal obtained from the wheel speed sensors 31 and the brake switch 32. First, the device 30 is initialized (S1), and the wheel speeds are determined by signals obtained from the wheel sensor 31 (S2). An estimation of the deceleration of a front wheel (value determined by wheel deceleration of front two wheels) is obtained. Further, an estimation of the wheel deceleration of rear wheel (value determined by wheel deceleration of rear two wheels) is also obtained. Both estimates are determined by wheel speed information (S3, S4). More specifically, the estimates are obtained using information such as wheel speeds, the estimated vehicle speed and estimated vehicle deceleration speed (value determined by the decleration of front and rear four wheels) (S5, S6). From the value determined, the brake control modes such as anti-lock brake control mode or a braking force distribution mode are selected (S7, S8). For the anti-lock brake control mode (S9), the anti-lock brake control is operated (S11), but the anti-lock brake control mode is not selected (S9) and the braking force distribution control mode is evaluated (S10). For the braking force distribution control mode (S10), braking force distribution control (S12) is operated. However, if no braking force distribution mode is selected (S10), the brake operation (S13) is maintained in its normal mode.

Normal Brake Control

During normal brake control operation the brake pedal 1 is stepped on thereby creating hydraulic pressure at the master cylinder 12. Since the inlet valve 23 is open while the outlet valve 24 is closed, the brake hydraulic pressure created at the master cylinder 12 is directly transferred to the wheel cylinders 14. This results in the application of a braking force on the respective vehicles wheels 1, 2, 3 and 4.

Anti-lock Brake Control

The electronic control device 30 operates the anti-lock control. For example, the device 30 controls the opening and closing of the inlet valve 23 and the outlet valve 24 and controls the pumps 25 when the vehicle is braked and locked.

During anti-lock brake control, hydraulic pressure is controlled by quickly and repeatedly increasing holding, and decreasing pressure during every cycle. For instance, during the pressure increase mode of one cycle, the opening and closing of the inlet valve 23 is controlled and the outlet valve 24 is closed thereby increasing the pressure of the brake fluid at the wheel cylinder 4.

Braking force distribution control is explained in the following section.

Figure 4:
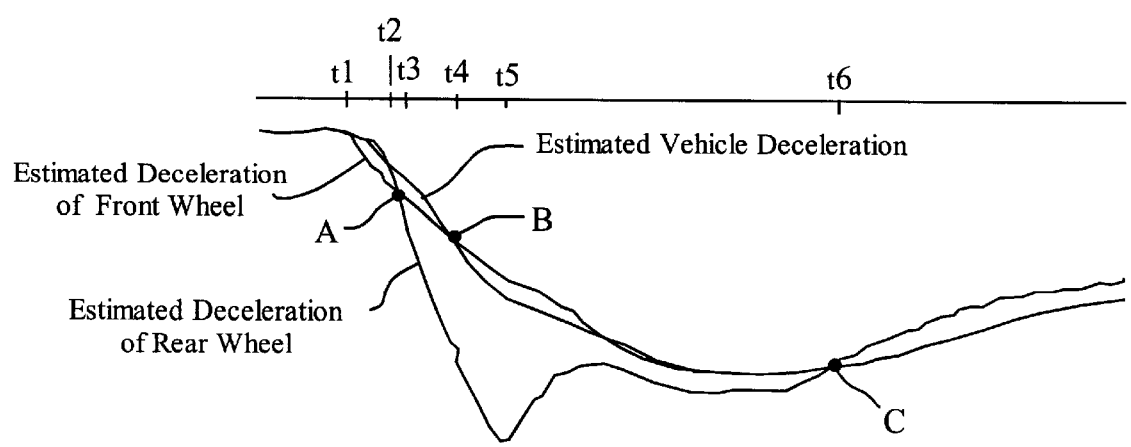
FIG.4 is a time-flow-chart of deceleration when not strongly or quickly pressing the brake pedal.
Figure 5:
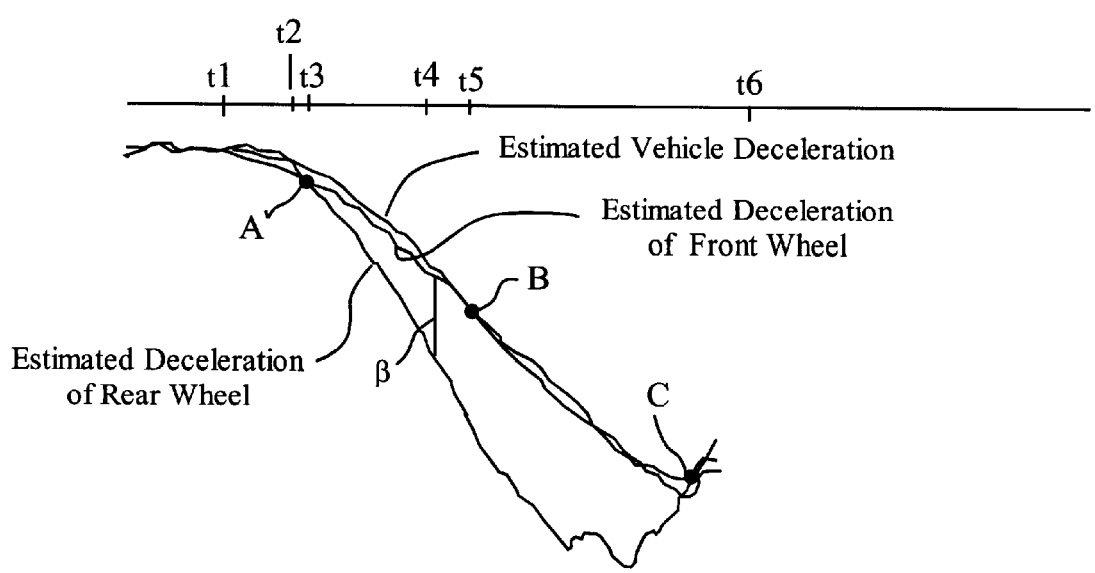
FIG. 5 is a time-flow-chart of deceleration when not strongly or quickly pressing the brake pedal.

FIGS. 4 and 5 illustrate time-flow-charts of the estimated deceleration of front and rear wheels and the estimated vehicle deceleration during the operation of braking force distribution control.

A Time-Flow-Chart of Deceleration During a Forceful or Quick Brake Pedal Stroke

When forceful, rapid pressure is applied to the brake pedal 11, the estimated vehicle deceleration gradually increases as shown in FIG. 4. However, the estimated deceleration of the front wheel departs from the estimated vehicle speed at t1 and thereafter increases to meet the estimated vehicle speed at t4 (point B). The estimated deceleration of the rear wheels departs from the estimated vehicle deceleration and rapidly increases at t2, meets the estimated deceleration of front wheels at t3 (point A), further increases, reaches the maximum at t5, begins to decrease at t5, and meets the estimated deceleration of front wheels at t6 (point C) again. Measured deceleration may be negative acceleration. Thus a large absolute value indicates a large deceleration.

When the brake pedal is depressed, the vehicle load shifts. Point B shows that the front wheel load undergoes the greatest shift. The ground load of the front wheels reaches its maximum and then decreases. The point C shows the point where the ground load has shifted to and equalized with the rear wheels after releasing the brake.

A Time-Flow-Chart of Deceleration During Normal Brake Stroke (i.e., not forceful/quick stroke)

When the brake pedal 11 is depressed at normal speed, the estimated vehicle deceleration of the front wheel becomes slightly higher than the estimated vehicle deceleration at t1 as shown in FIG. 5. Further, the estimated deceleration of the rear wheel becomes slightly higher than the estimated vehicle deceleration at t2, meets the estimated deceleration of front wheels at t3 (point A), and gradually departs from the estimated deceleration of the front wheel and increases. In addition, the estimated deceleration of the rear wheels becomes higher, and the difference between the estimated deceleration of the rear wheel and the front wheels becomes β at t4. The estimated vehicle deceleration meets the estimated wheel deceleration of the front wheel again at t5 (point B), and then becomes lower after the point B.

As with the forceful/quick pedal stroke, t6 (point C) shows the point where the ground load has shifted to the rear wheels after the brake pedal is released.

Requirements for the Operation of Braking Force Distribution Control

Figure 6:
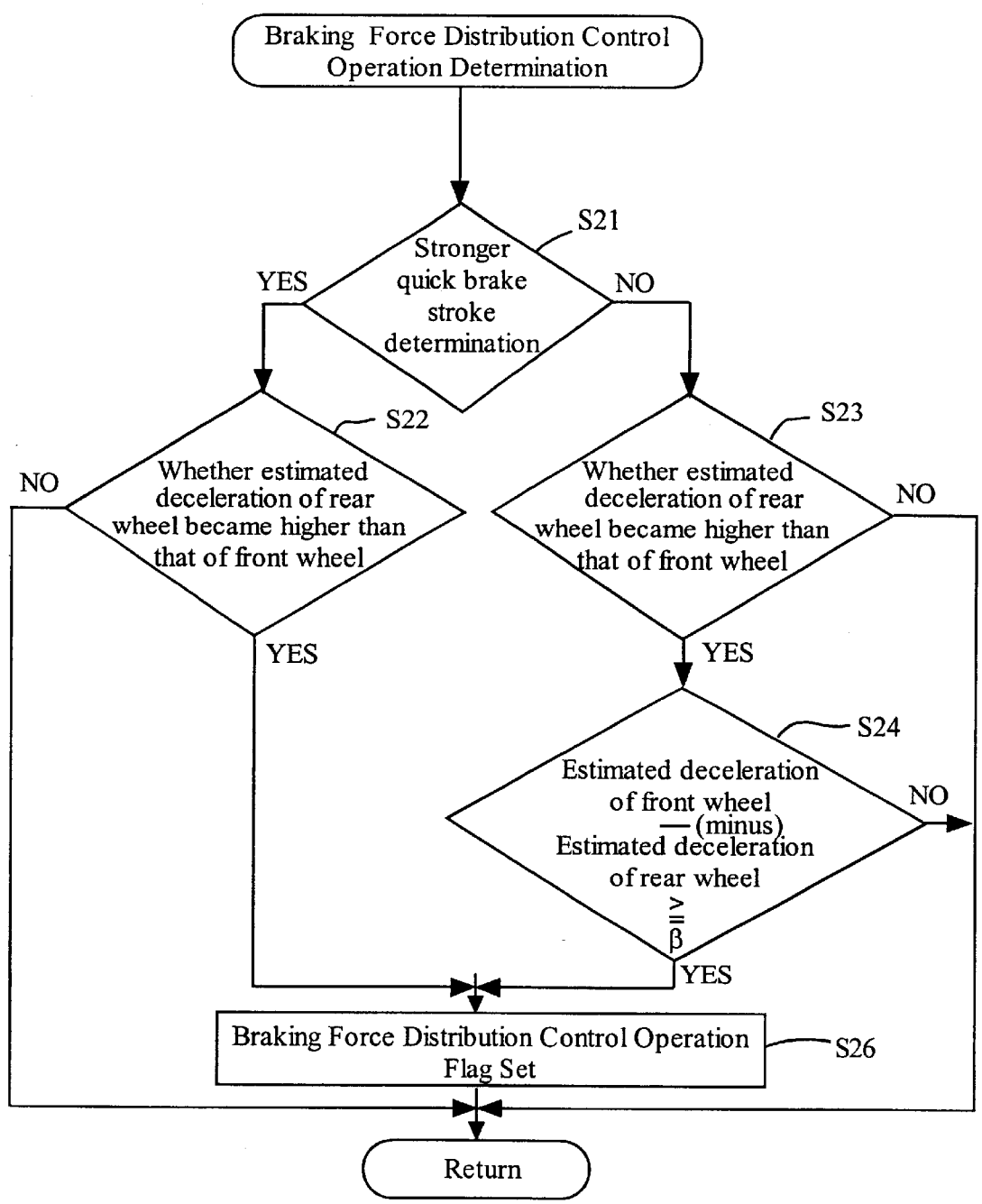
FIG. 6 is a flow-chart of the initiation of braking force distribution control.

As shown in FIG. 6, an initial determination must be made on whether to use the braking force distribution control on the rear wheels. This determination is made by judging the strength, speed, and degree of the brake pedal 11 stroke. Separate determinations are made for each quick brake stroke. The determination of the type of brake pedal 11 stroke depends upon the degree of change in the estimated vehicle deceleration or wheel deceleration (S21). For example, the estimated vehicle deceleration or the estimated wheel deceleration is calculated at every cycle (e.g., every 7 ms). The difference between the previous and current cycles is then determined. If the difference is equal to or more than the predetermined value ($\Delta \alpha$) and it continues for the predetermined time ($\tau$) or occurs a predetermined number of times or more than the braking force distribution control is terminated. For example, the predetermined degree of change ($\Delta \alpha$) and the predetermined continuation time ($\Delta \alpha$) or the predetermined number of times may be 0.4 G and 27 ms, or 4 times, respectively. Reaching any one, two or all three of the valves can provide a signal to terminate braking force distribution control on the rear wheels. Other parameters such as speed and frequency of brake pedal strokes could be used as criteria to judge if the braking force distribution control should be terminated.

Requirements of the Operation of Braking Force Distribution Control When in a Forceful or Quick Brake Pedal Stroke When the brake pedal is forcefully or quickly pressed, the estimated deceleration of the front and rear wheels are compared to determine whether the estimated deceleration of the rear wheel will be greater than that of front wheel (S22). First, an estimate is made if the increase in deceleration of the rear wheel due to load shifting caused by braking. Second, an estimate is made of the increase in deceleration of the front wheel. Thirdly, a determination is made as to whether both the estimated deceleration of the front and rear wheels equalize at (point A). If the estimated deceleration of the rear wheel increases more than that of front wheel, the system proceeds with step S26 and braking force distribution control is initiated. However, if the estimated deceleration of rear wheels does not show a greater increase, no braking force distribution control is operated.

When forceful or quick brake pedal strokes are applied, the pressure increases the rate at which the brake hydraulic pressure accelerates. In such a situation, the braking force distribution control must be operated before the vehicle load shifts. In these situations, data is obtained by conducting a quick brake stroke determination. The brake force distribution control is continued until point A and there is a decreased influence by wheel ground pressure due to load shifting.

Requirements of the Operation of Braking Force Distribution Control When not in a Strong or Quick Brake Pedal Stroke If the quick brake stroke determination (S21) did not determined that the brake pedal 11 was forcefully or quickly pressed, the estimated deceleration of front and rear wheels are compared. This comparison is made to determine whether the estimated deceleration of the rear wheels increased relative to that of front wheel (S23). If the estimated deceleration of rear wheels increased and the value of the estimated deceleration of front wheel minus that of rear wheel was equal to some value $\beta$ or more (S24) after the point A where the estimated deceleration of front and rear wheels became equal, braking force distribution control is operated (S26). However, if the value obtained is less than $\beta$, the braking force distribution control is terminated.

If the brake pedal 11 is not forcefully or quickly pressed, rapid vehicle deceleration change does not continue. However, the load has already shifted and braking force distribution control is to be operated until the front wheel load shifts to the end, i.e, the point B.

In addition, in the step S23, the estimated deceleration of front wheel is compared with that of the rear wheel, and the point after when the estimated deceleration of the rear wheel becomes higher than that of front wheels (point A) until when the estimated deceleration of front wheel becomes equal to the estimated vehicle speed (point B) may be substituted for the point that the estimated deceleration of rear wheels increases relative to the front wheel.

Braking Force Distribution Control

The braking force distribution control governs the brake hydraulic pressure of the wheel cylinder of the rear wheel. Instead of using a proportioning valve (P valve), the braking force distribution control makes it possible to maintain the brake hydraulic pressure of the rear wheel at a low level compared to that of the front wheel. In addition, in an anti-lock brake control device, even when factors such as a motor and a pump fails, which prevents operation of anti-lock brake control, braking force distribution control controls the braking thereby making it possible to avoid rear wheel slip.

Figure 7:
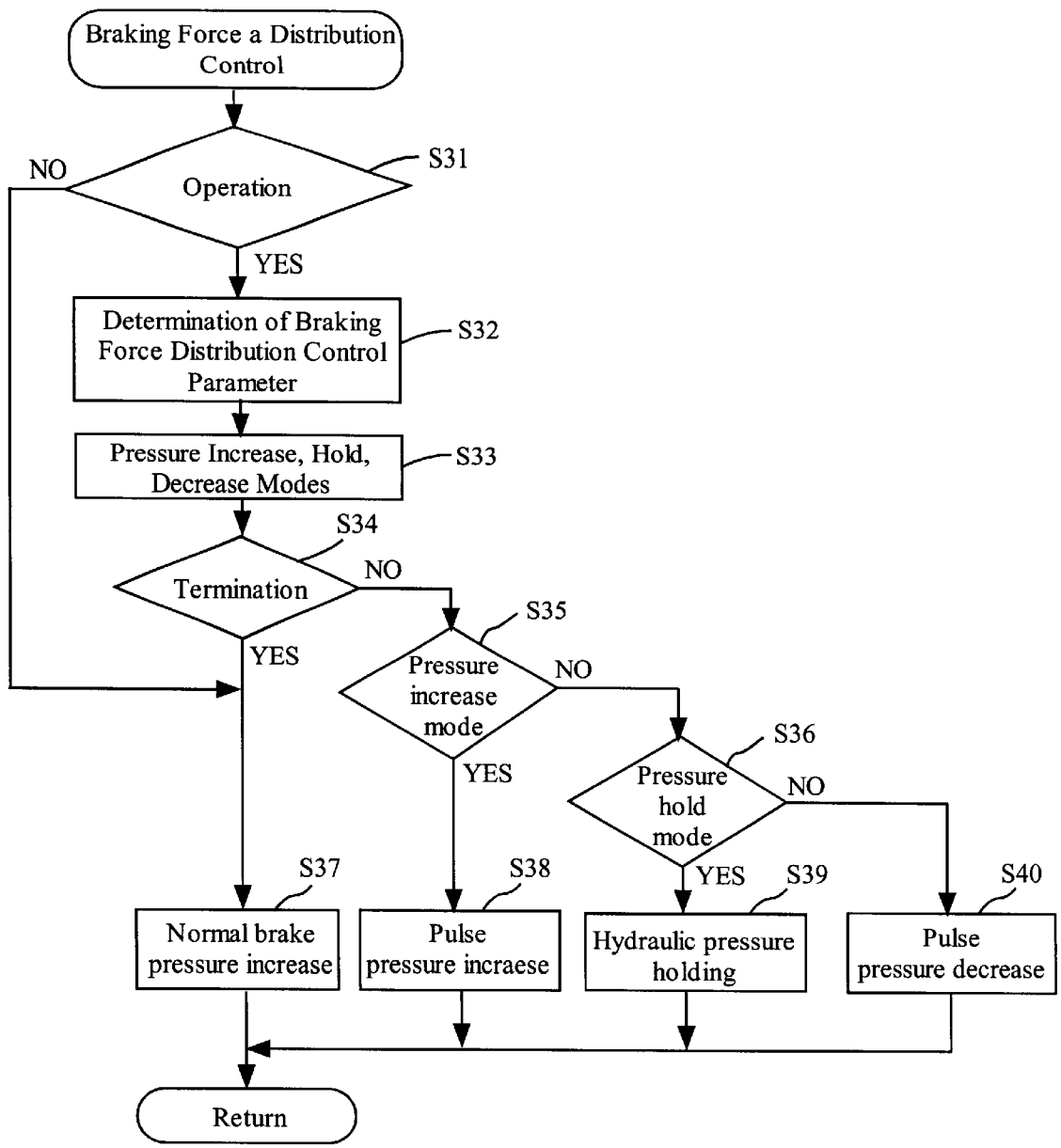
FIG. 7 is a flow-chart of the operation of braking force distribution control.

As shown in the flow-chart FIG. 7, data is gathered and "yes" and "no" questions answered in order to decide whether to start braking force distribution control (i.e., whether a start flag is set) (S31),or alternatively whether hydraulic pressure is increased with normal brake control (S37). If the flag was set, parameters necessary for braking force distribution control such as rear wheel slip ratio relative to front wheels are determined (S32). The pressure increase mode, the pressure holding mode, or the pressure decrease mode of brake hydraulic pressure are selected from the parameters determined (S33). Thereafter a determination of whether braking force distribution control is to be determined is made (S34). If braking force distribution control is terminated normal brake control is operated (S37). However, if it is not terminated, hydraulic pressure of rear wheel cylinder is increased (S38) held (S39), or decreased (S49) by going through the steps S35 and S36 based on the result of the brake control mode determination at the step S33.

Requirement 1 for a Termination of Braking Force Distribution Control

Figure 8:
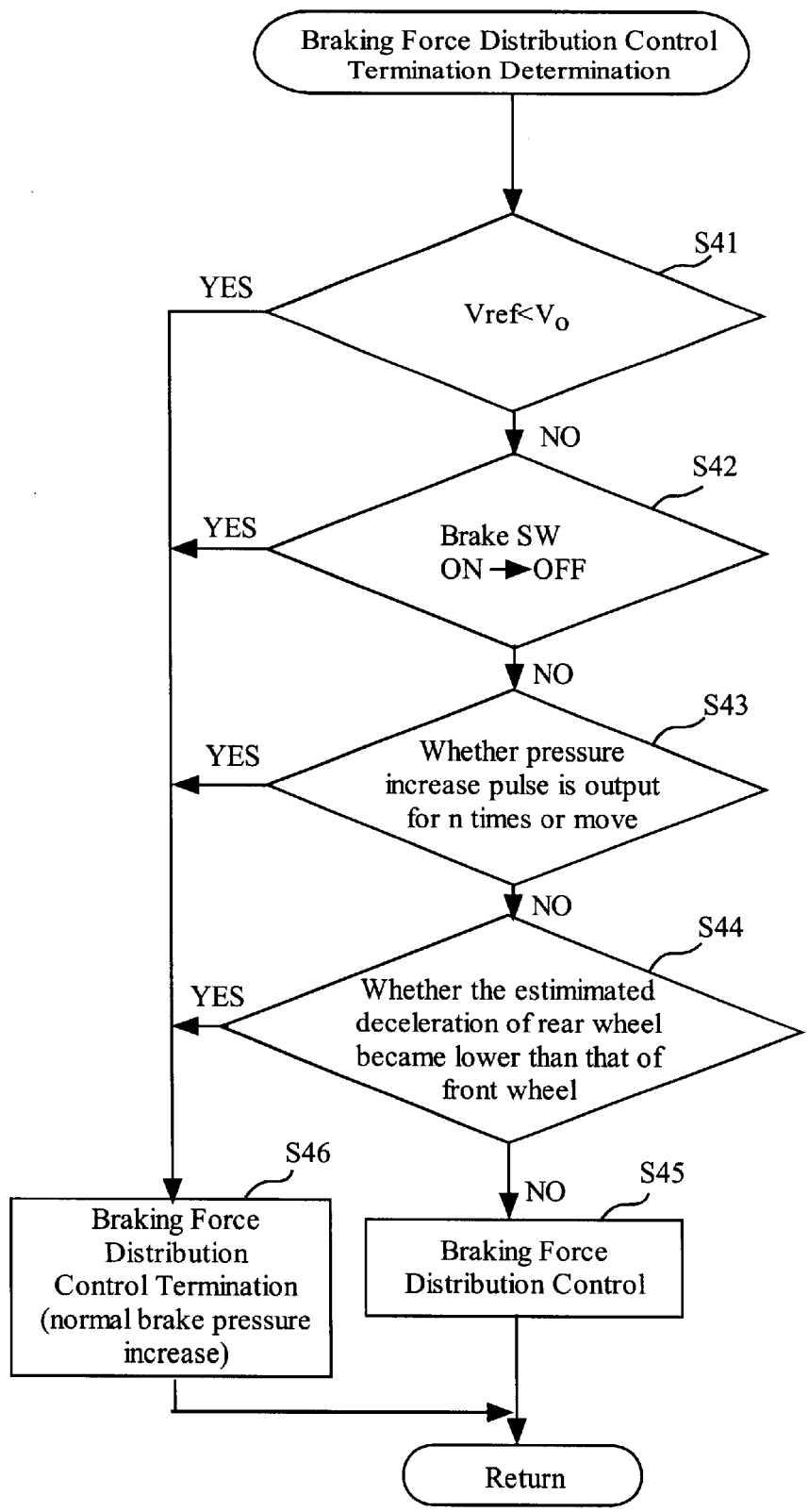
FIG. 8 is a flow-chart of determining the termination of braking force distribution control.

An early termination of braking force distribution control is preferable when the vehicle is operating under normal conditions. For example, as shown in FIG. 8, when a vehicles's speed is sufficiently low as to not require braking force distribution control the vehicle is close to stop (S41). For example, whether the estimated vehicle speed Vref is lower than the predetermined value V0 is determined. If the vehicle speed becomes close to zero, the system shifts to normal brake control (S46). Although the predetermined value V0 depends upon various conditions such as a vehicle condition and a road condition, for example, it may be 1 kilometer or higher.

If the estimated vehicle speed Vrf is higher than V0, a determination is made as to whether the brake switch is on or off (S24). If the brake switch was turned off (from on), the braking operation is considered to be terminated and braking force distribution control is terminated to start normal brake control (S46).

If the brake switch is kept on, when the pressure increase pulse is output for n times or more in the pressure increase mode of braking force distribution control mode, and normal brake control is maintained (S43). The number of times, n means that no braking force distribution control is necessary. Determination of n depends upon factors such as vehicle structure and road condition, but it may be for example 8 times.

If the estimated deceleration of the rear wheels is lower than that of front wheels, side, which is considered that the vehicle wheels are not being locked and normal brake control is operated (S44). Accordingly, if the load shifting is a requirement for the determination of braking force distribution control, more accurate braking force distribution control may be operated. The termination requirements are not met in the steps S41 and S43, the operation may be terminated earlier in the step S44.

Requirement 2 for a Termination of Braking Force Distribution Control

Figure 9:
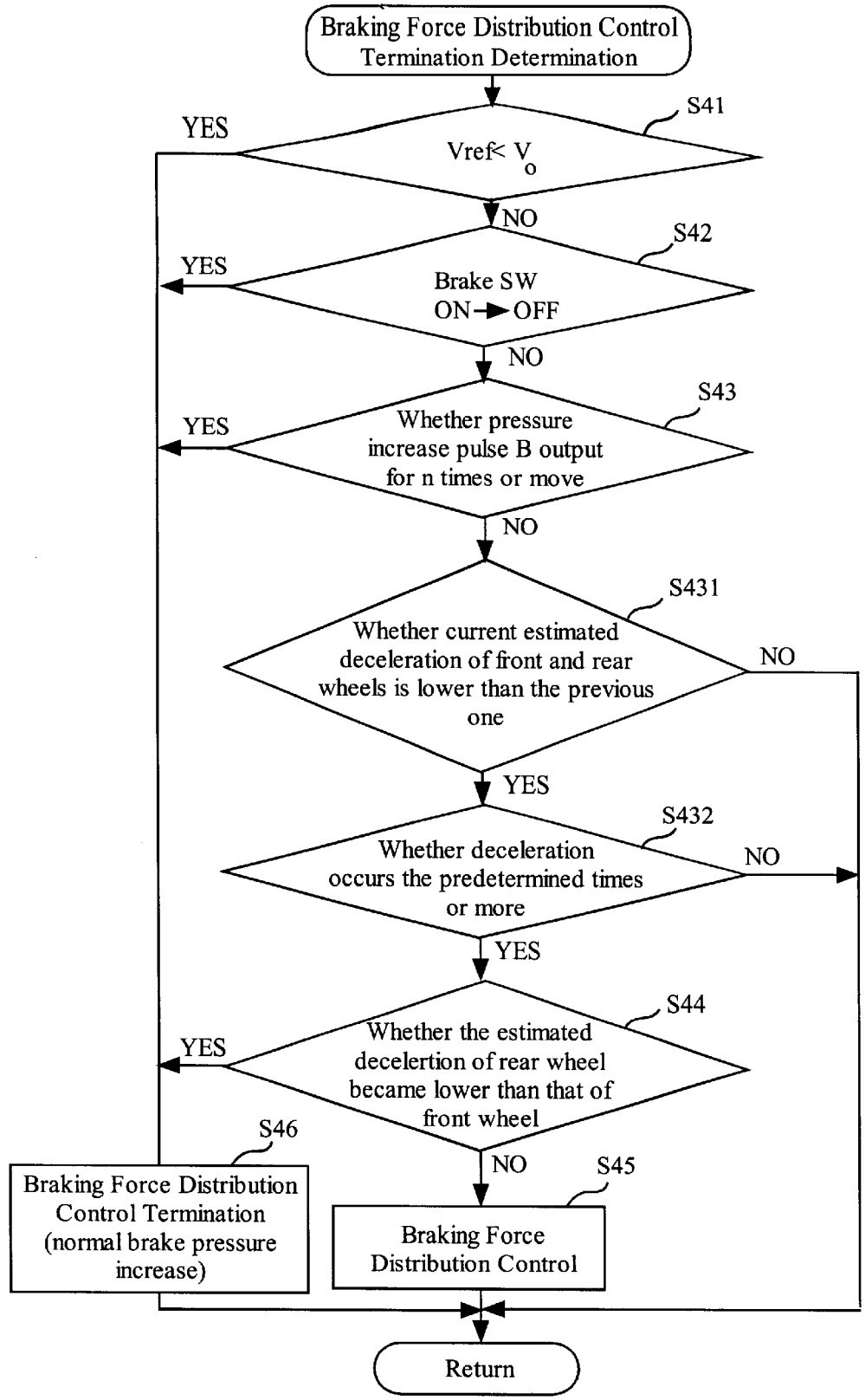
FIG. 9 is a flow-chart of determining the termination of braking force distribution control.

Determination of the increase and decrease of the estimated wheel deceleration as shown in FIG. 9 is added to the step in FIG. 8. Braking force distribution control can be terminated if (a), the pressure increase pulse is not output for n times or more in the pressure increase mode (step S43) or (b) the estimated deceleration of front and rear wheels determined at the current cycle is lower than the estimated deceleration of front and rear wheels determined at the previous cycle (S431). If it is lower, the degree of the estimated wheel deceleration is examined. For instance, whether the deceleration occurs a predetermined number of times or more is examined (S432). If deceleration occurred a predetermined times or more and the estimated deceleration of rear wheels becomes lower than that of front wheels (step S44), braking force distribution control is terminated (step S46). The predetermined number of the step S432 may be, for example, 10 times. There are a variety of methods of determining the decrease of estimated wheel speed. Estimates of wheel speed and wheel deceleration can be used in a variety of different combinations to obtain data for determining whether to terminate braking force distribution control.

If the estimated deceleration of front and rear wheels are not lower than the estimated deceleration of front and rear wheels determined at the previous cycle (S431) or do not continue for the predetermined times or more (S432), the system diverts out of its routine determination of the termination of braking force distribution control and returns to its normal brake control routine.

U.S. Pat. Nos. 5,795,039; 5,887,957; 5,842,755; 5,947,221; 5,938,299; 5,826,954; 5,810,455; 5,951,115; 5,947,224; 5,947,221; 5,931,546; 5,927,830; 5,913,578; 5,882,093; 5,869,943; 5,857,754; 5,853,229; 5,829,847; 5,810,456; 5,810,455; 5,772,289; 5,762,406; 5,752,752; 5,752,211; 5,711,585; 5,700,074; 5,697,682; 5,676,434; 5,646,849; 5,641,209; 5,640,324; 5,634,699; 5,624,164; 5,620,239; 5,806,939 and 5,758,930 are incorporated by reference to more fully disclose the present invention.

This invention has the following effects:

Braking force distribution control is terminated by determining the load shifting from the front to the rear wheels based upon the estimated deceleration of front and rear wheels, so that the timing of the termination of braking force distribution control is optimized.

For example, if a driver applies a pumping action to the brake braking force distribution control is terminated and the braking force of the rear wheels is more efficiently utilized.

It is readily apparent that the above-described invention has considerable commercial utility. It should be understood that the specific form of the invention hereinabove described is intended to be representative only, as certain modifications within the scope of these teachings will be apparent to those skilled in the art. Accordingly, reference should be made to the following claims in determining the full scope of the invention.

What is claimed is:

1. A method of initializing a braking force distribution control system, comprising the steps of:
   detecting brake pedal movement;
   detecting front wheel deceleration during brake pedal movement;
   detecting rear wheel deceleration during brake pedal movement; and
   initiating a brake force distribution control system when front wheel deceleration is less than rear wheel deceleration; wherein the braking force distribution control system comprises a main hydraulic circuit connecting a master cylinder to a front wheel cylinder and a rear wheel cylinder each via an inlet valve, an auxiliary hydraulic circuit connecting an auxiliary reservoir to the front wheel cylinder and the rear wheel cylinder each via an outlet valve, an electronic control device for controlling the main and the auxiliary hydraulic circuit, and a means for determining brake pedal movement and sending signals to the electronic control means which signal is an indicator of brake pedal movement.

2. The method of claim 1, wherein the rear wheel deceleration is determined to be less than the front wheel deceleration by a predetermined amount.

3. The method of claim 1, wherein, the brake force distribution control system is operated by signals received from the electronic control device.

4. The method of claim 3, wherein the electronic control device controls the inlet and outlet valves in response to the signals from the means for determining brake pedal movement.

5. A method of initializing a braking force distribution control system, comprising the steps of:
   detecting brake pedal movement;
   detecting front wheel deceleration during brake pedal movement;
   detecting rear wheel deceleration during brake pedal movement; and
   initiating a brake force distribution control system when the difference between the front wheel and the rear wheel deceleration exceeds a predetermined value wherein the braking force distribution control system comprises a main hydraulic circuit connecting a master cylinder to a front wheel cylinder and a rear wheel cylinder each via an inlet valve, an auxiliary hydraulic circuit connecting an auxiliary reservoir to the front wheel cylinder and the rear wheel cylinder each via an outlet valve, an electronic control device for controlling the main and the auxiliary hydraulic circuit; and a means for determining brake pedal movement and sending signals to the electronic control means which signal is an indicator of brake pedal movement.

6. The method of claim 5, wherein, the brake force distribution control system is operated by signals received from the electronic control device.

7. The method of claim 6, wherein the electronic control device controls the inlet and outlet valves in response to the signals from the means for determining brake pedal movement.

8. A system for initializing a braking force distribution control system, comprising:
   a means for detecting brake pedal movement;
   a means for detecting front wheel deceleration during brake pedal movement;

a means for detecting rear wheel deceleration during brake pedal movement;

a means for analyzing front wheel deceleration relative to rear wheel deceleration;

an electronic control means which operates the braking force distribution control system when front wheel deceleration is determined to be less than rear wheel deceleration;

a main hydraulic circuit connecting a master cylinder to a front wheel cylinder and a rear wheel cylinder each via an inlet valve; and an auxiliary hydraulic circuit connecting an auxiliary reservoir to the front wheel cylinder and the rear wheel cylinder each via an outlet valve.

9. The system of claim 8, wherein the braking force distribution control system is initialized on receiving signals from the electronic control device indicating the front wheel deceleration is determined to a predetermined amount, or more, less than the rear wheel deceleration.

* * * * *

UNITED STATES PATENT AND TRADEMARK OFFICE
CERTIFICATE OF CORRECTION

PATENT NO. : 6,276,767 B1  
DATED : August 21, 2001  
INVENTOR(S) : Nishizawa

Page 1 of 1

It is certified that error appears in the above-identified patent and that said Letters Patent is hereby corrected as shown below:

Please replace the word "incraese" to -- increase -- on Figure 7, directed to number S38.

Signed and Sealed this

Twenty-first Day of May, 2002

Attest:

JAMES E. ROGAN  
*Director of the United States Patent and Trademark Office*

*Attesting Officer*